(12) United States Patent
Farreyrol et al.

(10) Patent No.: US 12,162,799 B2
(45) Date of Patent: Dec. 10, 2024

(54) CONDUCTIVE BUSBAR FOR ELECTRICAL CONNECTION ON VEHICLE WINDOW

(71) Applicant: ACR II GLASS AMERICA INC., Nashville, TN (US)

(72) Inventors: Olivier Farreyrol, Wasserbillig (LU); Wladislaw Bronstein, Trier (DE); Katharina Boguslawski, Trier (DE); Jean-Marc Sol, Thionville (FR); Norihiro Kato, Franklin, TN (US)

(73) Assignee: ACR II GLASS AMERICA INC., Nashville, TN (US)

( * ) Notice: Subject to any disclaimer, the term of this patent is extended or adjusted under 35 U.S.C. 154(b) by 97 days.

(21) Appl. No.: 17/422,489

(22) PCT Filed: Jan. 15, 2020

(86) PCT No.: PCT/US2020/013643
§ 371 (c)(1),
(2) Date: Jul. 13, 2021

(87) PCT Pub. No.: WO2020/150324
PCT Pub. Date: Jul. 23, 2020

(65) Prior Publication Data
US 2022/0081356 A1     Mar. 17, 2022

Related U.S. Application Data

(60) Provisional application No. 62/792,515, filed on Jan. 15, 2019.

(51) Int. Cl.
*B32B 3/10*     (2006.01)
*B32B 17/10*    (2006.01)
(Continued)

(52) U.S. Cl.
CPC .... *C03C 17/3673* (2013.01); *B32B 17/10036* (2013.01); *B32B 17/1022* (2013.01);
(Continued)

(58) Field of Classification Search
None
See application file for complete search history.

(56) References Cited

U.S. PATENT DOCUMENTS

| | | |
|---|---|---|
| 4,831,493 A | 5/1989 | Wilson et al. |
| 5,756,192 A | 5/1998 | Crawley et al. |

(Continued)

FOREIGN PATENT DOCUMENTS

| | | | |
|---|---|---|---|
| CN | 1675731 A | | 9/2005 |
| CN | 102795793 A | * | 11/2012 |

(Continued)

OTHER PUBLICATIONS

Machine translation of CN-102795793-A (Year: 2012).*
(Continued)

*Primary Examiner* — Christopher M Polley
(74) *Attorney, Agent, or Firm* — K&L Gates LLP

(57) ABSTRACT

The present disclosure relates to producing an electrically connected coated substrate. An example method comprises providing a coating on a surface of a substrate; and applying an electrically conductive material to the coating. The electrically conductive material is not heated above 500° C.

8 Claims, 8 Drawing Sheets

(51) Int. Cl.
  *B60J 1/00* (2006.01)
  *C03C 17/36* (2006.01)
  *H05B 3/86* (2006.01)
(52) U.S. Cl.
  CPC ............ *B60J 1/00* (2013.01); *C03C 17/3644* (2013.01); *H05B 3/86* (2013.01); *B32B 2255/205* (2013.01); *C03C 2217/256* (2013.01); *C03C 2217/262* (2013.01); *H05B 2203/017* (2013.01)

(56) References Cited

U.S. PATENT DOCUMENTS

| | | | |
|---|---|---|---|
| 6,094,981 | A | 8/2000 | Hochstein |
| 6,492,618 | B1 | 12/2002 | Flood et al. |
| 6,492,619 | B1 * | 12/2002 | Sol .................... B32B 17/10229 52/171.2 |
| 6,686,050 | B2 | 2/2004 | Lingle et al. |
| 7,180,031 | B1 | 2/2007 | Loibl et al. |
| 8,431,867 | B2 | 4/2013 | Blanchard et al. |
| 9,482,799 | B2 | 11/2016 | Hevesi |
| 9,596,719 | B2 | 3/2017 | Offermann et al. |
| 9,981,633 | B2 | 5/2018 | Liainaki et al. |
| 10,036,193 | B2 | 7/2018 | Decraye et al. |
| 10,638,550 | B2 | 4/2020 | Schall et al. |
| 10,703,072 | B2 | 7/2020 | Klein et al. |
| 2003/0019859 | A1 | 1/2003 | Sol |
| 2003/0207644 | A1 | 11/2003 | Green et al. |
| 2005/0221062 | A1 * | 10/2005 | Mann ................ B32B 17/10293 428/210 |
| 2013/0092676 | A1 | 4/2013 | Offermann et al. |
| 2014/0234578 | A1 | 8/2014 | Decraye et al. |
| 2018/0098386 | A1 | 4/2018 | Masschelein et al. |
| 2018/0222156 | A1 | 8/2018 | Klein et al. |
| 2019/0381766 | A1 * | 12/2019 | Mellor ............... B32B 17/10293 |
| 2020/0359467 | A1 | 11/2020 | Farreyrol et al. |

FOREIGN PATENT DOCUMENTS

| | | | |
|---|---|---|---|
| CN | 107432059 | A | 12/2017 |
| JP | H6-187833 | A | 7/1994 |
| JP | 2001-048602 | A | 2/2001 |
| JP | 2001122643 | A | 5/2001 |
| JP | 2006-110587 | A | 4/2006 |
| JP | 2013-532115 | A | 8/2013 |
| JP | 2014-524875 | A | 9/2014 |
| JP | 2017-535025 | A | 11/2017 |
| JP | 2019-501848 | A | 1/2019 |
| JP | 2021-510667 | A | 4/2021 |
| WO | WO-2018134608 | A1 * | 7/2018 ....... B32B 17/10036 |

OTHER PUBLICATIONS

International Search Report and the Written Opinion for International application No. PCT/US2020/013643, Jan. 15, 2020, mailed on Apr. 7, 2020, by International Search Authority/US, 7 pages.
Das, et al., "Joining Technologies for Automotive Battery Systems Manufacturing", World Electric Vehicle Journal, published on Jul. 5, 2018.
Extended European Search Report for related European Application No. 20741182.8; action dated Feb. 28, 2022; (5 pages).
Notification of the First Office Action and Search Report for corresponding Chinese Patent Application No. 202080009361.6, mailed Feb. 1, 2024. 10 pages.
Japanese Office Action, JP Patent Application No. 2021-539901 dated Dec. 20, 2023, with English language translation.
Notice of Reasons for Refusal for Japanese Patent Application No. 2021-539901, mailed May 7, 2024 (English Translation included). 16 pages.

* cited by examiner

CONDUCTIVE BUSBAR FOR ELECTRICAL CONNECTION ON VEHICLE WINDOW

CROSS REFERENCE TO RELATED APPLICATION

This application is a national stage of PCT International Application No. PCT/US2020/013643, filed Jan. 15, 2020, and claims priority to U.S. Provisional Patent Application No. 62/792,515 filed on Jan. 15, 2019, entitled "CONDUCTIVE PASTE FOR ELECTRICAL CONNECTION ON VEHICLE WINDOW," the content of which is incorporated by reference herein in its entirety.

TECHNICAL FIELDS

The present disclosure generally relates to an electrically conductive laminated vehicle glazing (e.g., vehicle windshield). More specifically, this disclosure relates to a busbar creation by etching a conductive coating to provide one or more electrical connections to the conductive coating on/in laminated vehicle windows.

BACKGROUND

Conductive coatings on a vehicle window may have various uses, including heating the window. Heatable laminated vehicle windows may be configured to melt snow, ice or frost, which may be especially useful during winter seasons or in cold areas. Such a heatable function may be provided by an infrared reflective (IRR) coating on the laminated vehicle windows which also significantly reduces infrared solar radiation into a vehicle and improves comfort in the vehicle.

Heatable IRR coating technology for automotive glazing may provide a coating comprising at least one layer of metallic silver, typically two or three metallic silver layers deposited by physical vapor deposition (PVD) (e.g., vacuum sputtering) or chemical vapor deposition (CVD) technologies. It also comprises several other thin layers for matching desired refractive indices, promoting adhesion, compensating for thermal expansion and/or reducing corrosion or scratches during production (e.g., during a bending process) or actual usage. Each thin film layer in the heatable IRR coating has a thickness of a few tens nanometers such that the heatable IRR coating is transparent or semi-transparent.

While the metallic silver layers in the heatable IRR coating are electrically conductive, most of the other layers, including a top layer, are dielectric or insulators, hence electrically non-conductive (e.g., metal oxides, metal nitride or metal oxynitride). As shown in FIG. 1, a conventional structure may include an outer glass pane 110, a polymer layer 118, a heatable IRR coating 116 and an inner glass pane 120. The heatable IRR coating 116 may be on a surface S3 122 of an automotive laminated glazing (e.g., windshield) where a surface S1 112 faces a vehicle exterior, a surface S2 114 is on an opposite side of the S1 surface 112, S2 114 and S3 122 surfaces are inside the laminated glazing, and a surface S4 124 is an external side of the glazing facing the inside of the vehicle.

The heatable IRR coating 116 may be deposited onto a large flat glass substrate/pane 120 (e.g., soda-lime glass substrate/pane manufactured by a float method known in the art). The flat, coated glass substrate 120 may then be bent in a thermal bending process temperature region (e.g., greater than 580° C. for soda-lime glass) to obtain a required three-dimensional shape, which may include cylindrical or spherical shapes, to be fit for a vehicle's window. It is desirable for the coating 116 to survive before and after heat treatment (e.g., during a thermal tempering or bending process), i.e., to be mechanically and/or chemically durable. For example, it may be desirable that the coating 116 does not oxidize, have visible light transmittance less than 70%, or show defects.

There are several examples of making automotive windows with IRR coatings. For example, U.S. Pat. No. 6,686,050 B2 generally discloses an example automotive window having an IRR coating comprising two metallic silver layers. U.S. Pat. No. 9,482,799 B2 generally discloses an example IRR coating comprising three metallic silver layers.

As described herein, and as shown in FIG. 3, the metallic silver layers 338 in the heatable IRR coating 116 are electrically conductive. The silver layers 338 may be a surface resistor, having a sheet resistance property, which may be connected to an external power source (e.g., a battery of a vehicle). The electrically conductive silver layers 338 provide an electrical heating function that may defrost or defog an automotive laminated window. The electrically conductive silver layers 338 may be sandwiched by non-electrically conductive dielectric (sub) layers 336; however, the silver layers 338 require electrical contact to provide the heating function. Typically, electrical contact may be formed via a busbar arrangement from/to the external power source. A busbar 232 may be a strip of conductive material screen printed onto an exposed surface of a conductively coated glass. The primary function of a busbar is to conduct electricity.

There are several examples of arranging busbars for automotive windows. For example, U.S. Pat. No. 6,492,619 B1 generally discloses a busbar arrangement for a heatable automotive window having a heatable IRR coating essentially consisting of two silver layers.

For example, silver paste enamel material 232 may be printed by a silk-screen printing process onto a heatable IRR coating deposited on a flat glass substrate before heat-treatment, i.e., thermal bending process. During the bending process, which concurrently fires the silver paste busbar 232 at a temperature range of 580 to 700° C., silver particles 334 in the enamel print 232 may migrate 340 from the top surface of the heatable IRR coating through the non-electrically conductive dielectric (sub)layers 336 and eventually reach the electrically conductive silver layers 338 (see FIG. 3). Finally, electric voltage is provided via the silver busbars 232 from the external power source (e.g., a DC battery in a vehicle) to the silver layers 338 in the heatable IRR coating in an automotive laminated window.

In sum, a conventional manufacturing process of a heatable laminated vehicle window known in the art may comprise the following steps, which are illustrated in FIGS. 2-3.

Step 1 comprises preparation of a flat outer glass pane 210 with S1 212 and S2 214 surfaces (e.g., cut and grinding), screen printing of opaque paste enamel 234 (e.g., black enamel printing) on the S2 214 surface, and firing the opaque enamel 234.

Step 2 comprises preparation of a flat inner glass pane 220 with surfaces S3 222 and S4 224. A heatable IRR coating 116 may be deposited on the S3 222 surface with optional screen printing of silver paste enamel 232 for busbar arrangement on the S3 222 surface. The silver paste enamel 232 is dried and pre-fired.

Step 3 comprises assembling the outer glass pane 210 and inner glass pane 220 such that the 51 212 surface of the outer glass pane 210 is mostly downward (i.e., the surface S2 214 is upward) and the S3 222 surface of the inner glass pane 220 is on and facing the S2 214 surface (i.e., the surface S4 224 is mostly upward), as shown in FIG. 2.

Step 4 comprises simultaneously bending the pair of glass panes 210, 220 of step 3 (e.g., paired glass bending). For example, a known gravity-sag bending process may be applicable. The silver busbar 232 of step 2 does not touch any transportation conveyor 240 at any time during step 4 (as shown in FIG. 2), and such silver busbar 232 is further fired during the thermal bending process. As described earlier, the silver particles 334 in the busbar 232 migrate and penetrate the heatable IRR coating 116 through non-electrically conductive sub-layers 336 and create electrical connection between the electrically conductive silver layers 338 in the coating and external power source (as shown in FIG. 3). The migration and penetration of the silver particles may occur during any firing process.

Step 5 comprises arranging an electrical connector onto the silver busbar 232 on the S3 222 surface or onto a foil tape conductively adhered to the silver busbar 232, arranging a polymer interlayer 218 (e.g., polyvinyl butyral, PVB, sheet of about 0.8 mm thickness), and performing a conventional lamination process (e.g., autoclaving).

SUMMARY OF DISCLOSURE

Embodiments disclosed herein include a method for producing an electrically connected coated substrate comprising providing a coating on at least one surface of the substrate, applying an electrically conductive material to the coating, and applying at least one electrical connector to the electrically conductive material, wherein the electrically conductive material is not heated above 500° C. In some embodiments, the electrically conductive material is a busbar. The coating may be heatable and may include an infrared reflective coating, a nanowire coating, a low-emissivity coating, a transparent conductive oxide, and combinations thereof. An infrared reflective coating may include at least two or three silver layers. The electrically conductive material may include tin, which may be a soldering paste.

In some embodiments, the substrate may be bent prior to applying the electrically conductive material. Preferably, the electrically conductive material may not be treated at temperatures above 300° C. The substrate may be a glass substrate or a polymer film. The electrically conductive material may further be treated with ultrasonic vibration. Methods may further include laminating the glass substrate with another glass substrate to provide a laminated glazing.

Further embodiments herein include a vehicle glazing, comprising a first glass substrate having surfaces S1 and S2 wherein S1 faces a vehicle exterior, a second glass substrate having surfaces S3 and S4 wherein S4 faces a vehicle interior, at least one polymer interlayer between the first glass substrate and the second glass substrate, and a coating on at least one surface of at least one of the first and second glass substrate, wherein an electrically conductive material is applied to the coating, wherein the electrically conductive material is attached to at least one electrical connector, wherein the electrically conductive material is not heat treated above 500° C.

In some embodiments, the coating may be provided on S2 or S3 and may be heatable. The coating may be an infrared reflective coating, a nanowire coating, a low-emissivity coating, a transparent conductive oxide, or combinations thereof. An infrared reflective coating may include at least two or three silver layers.

Electrically conductive materials may include tin, which may be in the form of a soldering paste. In some embodiments, the substrates may be bent prior to applying the electrically conductive material. Preferably, the electrically conductive material may not be treated at temperatures above 250° C. The electrically conductive material may be a busbar.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

In the following description, for purposes of explanation, specific details are set forth in order to promote a thorough understanding of one or more aspects of the disclosure. It may be evident in some or all instances, however, that any aspects described below can be practiced without adopting the specific design details described below. This disclosure relates to solutions for any conductive coating, including those having one or more conductive layers in a coating stack or other formulations of conductive material. The descriptions herein may refer to a particular embodiment, however, the application may not be limited to a particular conductive coating material.

Figure 1:
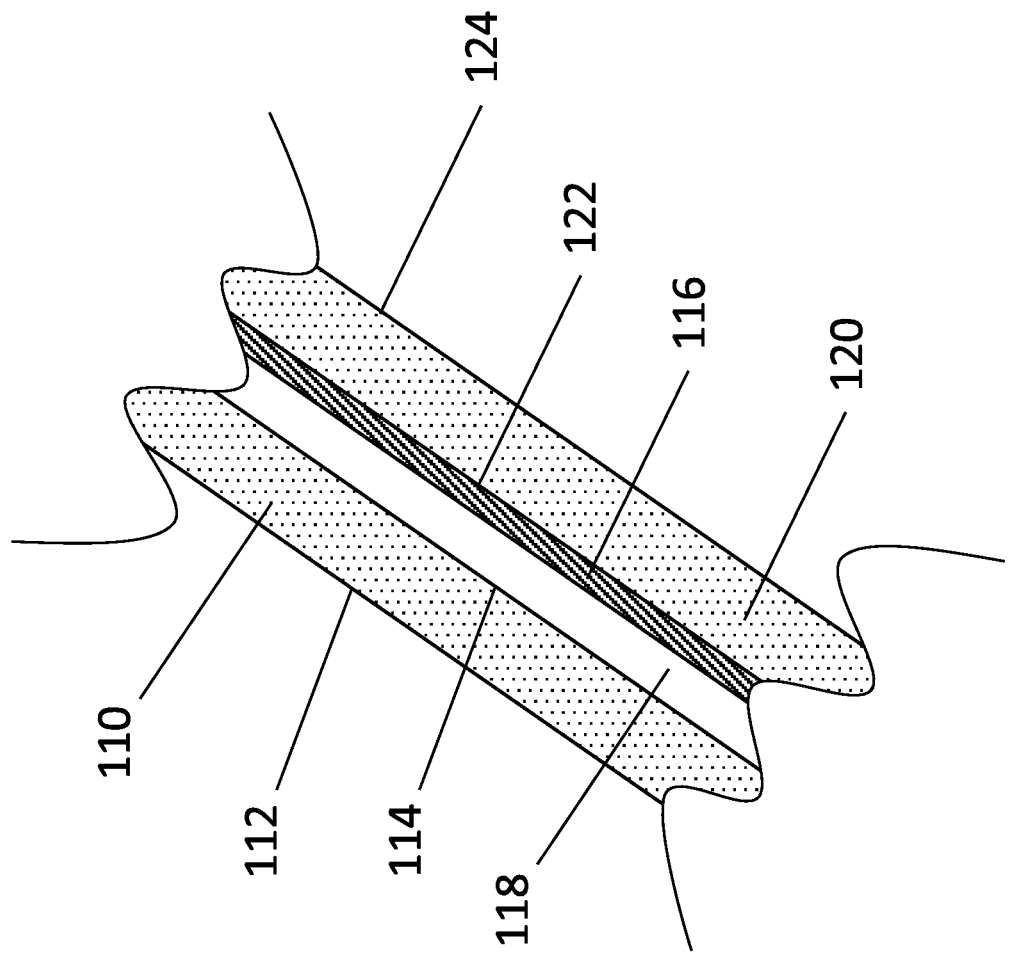
FIG. 1 illustrates a laminated glazing having a heatable coating technology for an automotive application.
Figure 2:
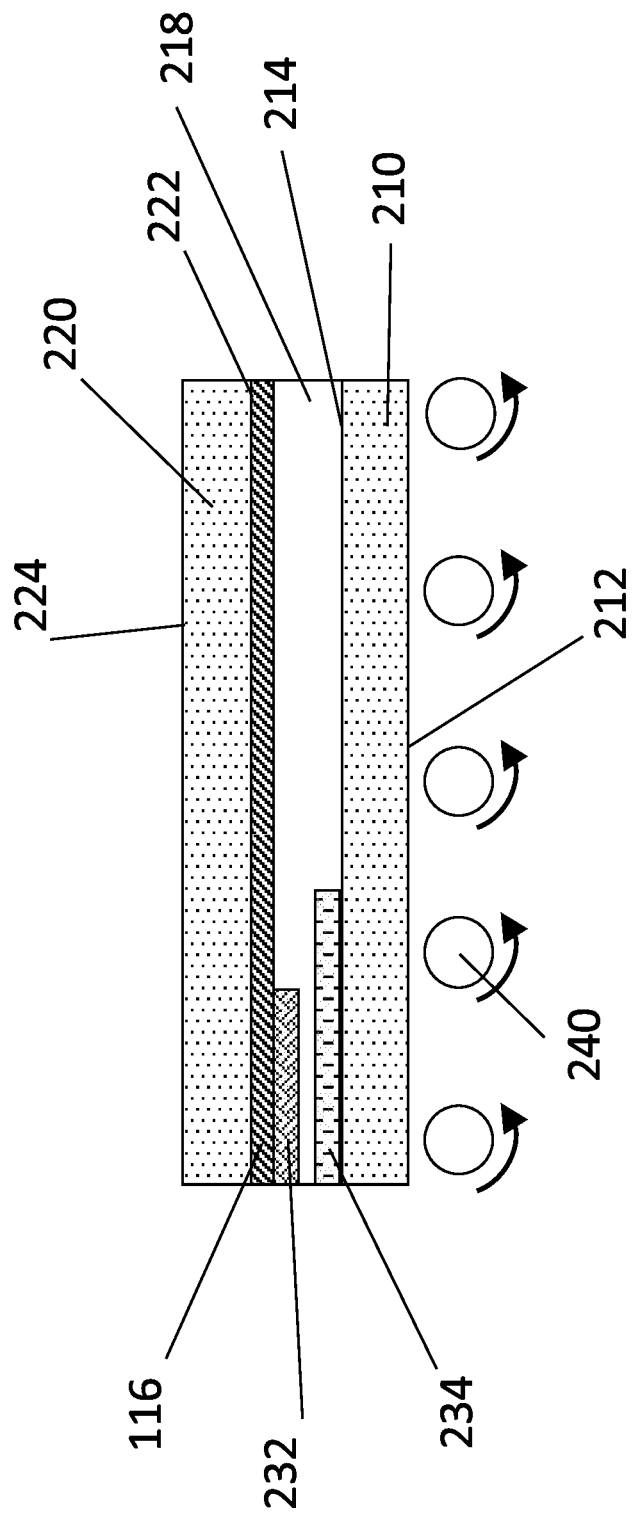
FIG. 2 illustrates an arrangement of inner and outer glass panes during a (double) bending process.

In some applications, glass panes are required to have a precise bent shape. Such applications may include the creation of a large projection area for head-up display (HUD) or more complicated shapes to improve design capability, such as a large panoramic windshield. Gravity sag bending, where inner and outer glass panes may be stacked through the bending process as shown in FIG. 2, may not be able to provide such precise bending shapes. However, more precise bending processes, which may include a press for attaining a desired shape, may require the glass substrates to be bent individually, rather than in a stacked pair.

Figure 4:
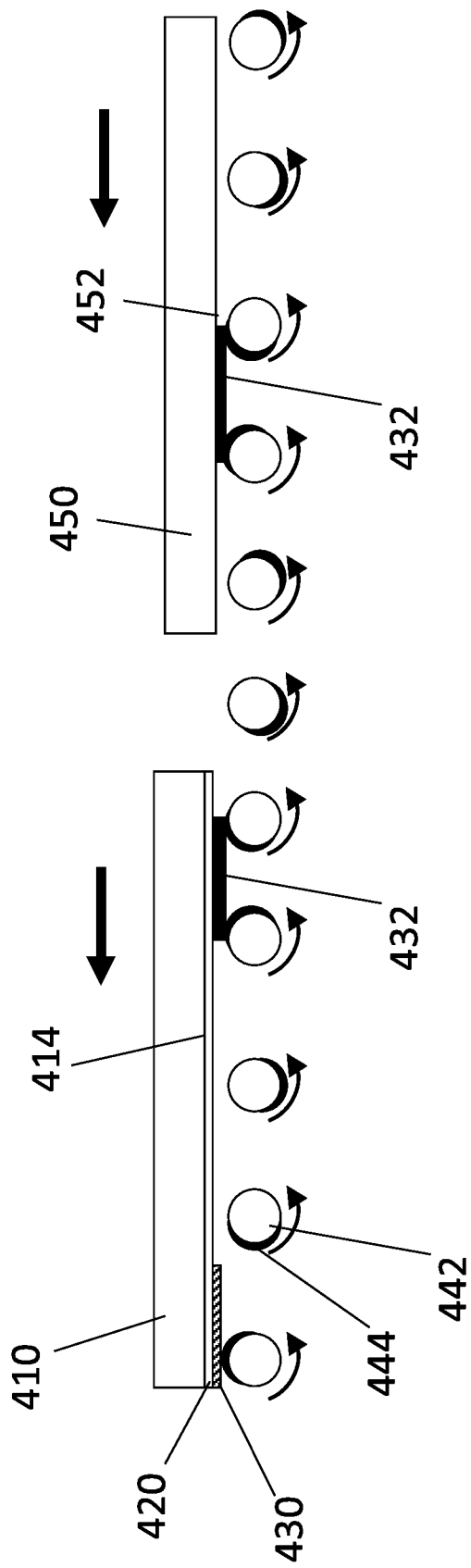
FIG. 4 illustrates a single glass bending process (technical problem to be solved)

As shown in FIG. 4, a single glass bending process may process an outer glass substrate 450 with a S1 452 surface facing downward and an inner glass substrate 410 with a S3 414 surface facing downward. The S1 452 and S3 414 surfaces may face downward to provide a desired orientation for bending the glass substrates 410, 450. Furthermore, each single glass pane 410, 450 may be driven by ceramic conveyer rollers 442 into a thermal press-bending furnace. However, it may be problematic to have silver busbars 430 created by screen printing on a heatable coating 420 on the S3 414 surface because the silver materials may transfer 444 to the conveyer rollers 442 causing pollution 432 of surface S1 452 and/or surface S3 414 of subsequent glass panes. Further, the silver busbars 430 may be damaged if exposed during the bending process, including the creation of scratches and other deformities, which may affect the formation of homogeneous electrical connections. During the bending process, the glass substrates may be heated to a glass substrate softening point such that the glass substrates bend in a three-dimensional shape, which may include cylindrical or spherical shapes. A silver busbar may create an uneven heating profile on the glass substrate and undesirable residual stress around the silver busbar as heat may be more concentrated in the area of the silver busbar. The resulting glass substrate may have reduced strength in the area of the silver busbar, which was heated differently than the rest of the glass substrate, which did not have a silver busbar. Further, the heat treatment of the silver busbar may form a strong bond to the glass substrate, such that any fractures in the silver busbar may expand to the glass substrate and result in breakage of the glass substrate. The silver busbar may be a weaker surface than the glass substrate, which may more easily fracture in such a way. It may be preferable to adhere the busbar to the glass substrate without heating or with heating in lower temperatures than the glass softening point wherein any fracturing may not extend to the glass substrate. Among other advantages, an object of the present disclosure is to solve the aforementioned problems.

Figure 3:
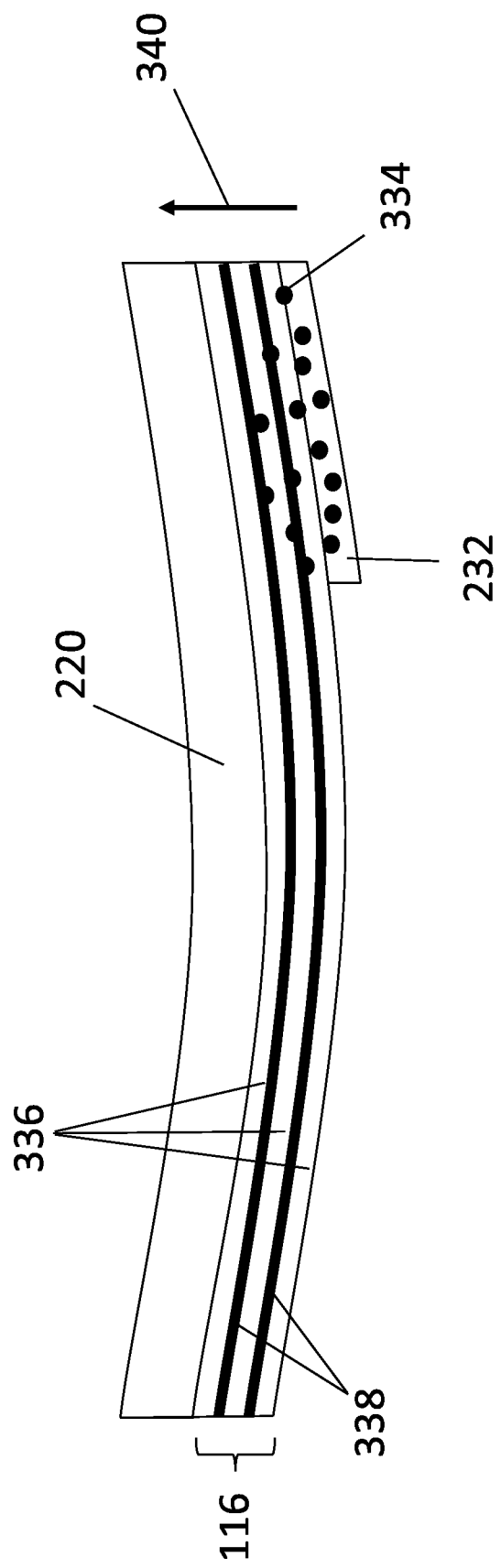
FIG. 3 illustrates a busbar arrangement for a heatable coating.

Further, silver particle migration and penetration 340 during firing (in the bending process), as shown in FIG. 3, may be insufficient to provide a desired electrical conduction to an underlying coating 116. In the firing process, silver particles 334 in a silver busbar 232 migrate 340 through an underlying coating stack 116 having silver 338 and non-conductive 336 layers during a heating treatment. FIG. 3 illustrates the migration 340 on a second glass substrate 220. In the case of a heatable IRR coating comprising three or more silver layers, silver particle migration may not reach each silver layer since a total layer thickness of the IRR coating comprising three silver layers is comparatively thicker than the thickness of an IRR coating comprising two silver layers. For example, the total thickness of an IRR coating comprising three silver layers may be in the range of about 300 to 500 nm while that of an IRR coating comprising two silver layers may be in the range of about 150 to 250 nm. Even where a coating includes one or two conductive layers, the silver particles may not migrate to the conductive layers if not fired correctly. Further, top coating materials and intermediate non-conductive layers may not readily allow the transfer of silver particles 334, even where there are one or two silver layers. Coating development may be hindered by such a restriction. A strong top coat or non-passable materials through which silver particles may not migrate may be desired in a conductive coating but would not allow for a silver busbar to electrically connect to the conductive silver layers within the coating. Further, conductive coatings, including low-E, transparent conductive oxides, and conductive nanowire coatings, such as silver nanowires (AgNW), may also have a top coat or other non-conductive materials. Nanowires, for example, may be individually coated with material that may not be durable and/or passive to silver particles. The conductive coating, in any form, may further be heatable. Thus, another object of the present disclosure is to provide an efficient bus bar creation and arrangement for a conductive laminated glazing with a conductive coating.

Yet another object of the present disclosure is to provide a process for cost efficient busbar creation and arrangement with improved productivity.

Disclosed herein, among other features, is a process of forming at least one busbar in a coating, such that the busbar is connected to electrically connectable materials in the coating. Particularly, the busbar may be formed after a thermal bending process. The busbar may be formed by the application of an electrically conductive material to the coating surface. Electrically connectable materials of the coating, such as silver layers, may not be readily available when coated on a substrate. For example, some coatings may include a top coat covering electrically connectable materials. The electrically conductive material applied onto the coating to form a busbar may be such that it can connect to the electrically connective materials in the coating which are not exposed to a surrounding environment without the electrically conductive material. The electrically conductive material may include various components, which may etch into the coating surface. As used herein, "etch" may include decomposition of coating materials to expose or reach underlying coating materials, which may be electrically connectable, or chemical bonding with coating layers to reach underlying coating materials, which may be electrically connectable. The coating materials to be decomposed may include oxide materials. In one embodiment, an external field(s) including ultrasonically-produced low or high pressure fields, such as a cavitation field, which may generate periodic impulsive force to breakdown existing chemical bonding of coating materials, may be used to etch the coating.

Figure 5:
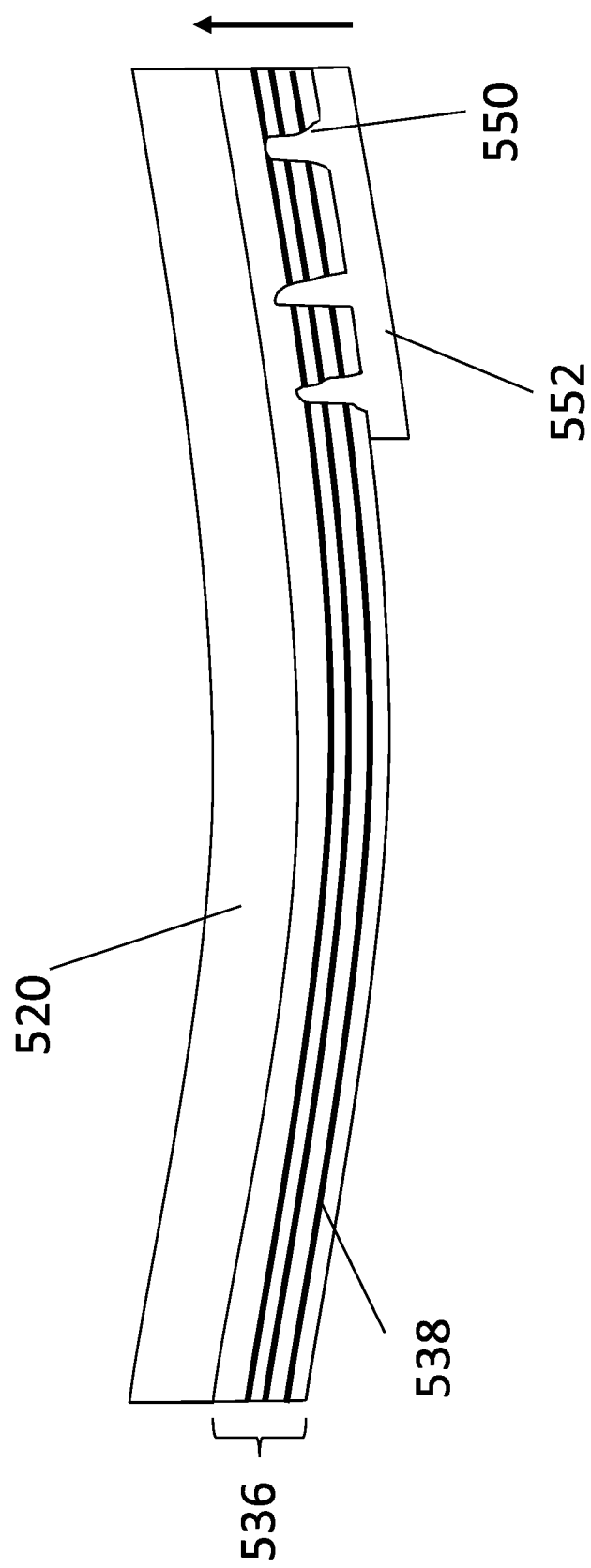
FIG. 5 illustrates a conductive etching process performed on a coating on bent glass, according to an exemplary aspect of the present disclosure.

Referring now to FIG. 5, as the electrically conductive material 552 etches into the coating 536, the electrically conductive material 552 reaches conductive layers 538 of the coating 536, creating an electrical connection for the busbar formation. Thus, the electrically conductive material 552 simultaneously etches the coating 536 and electrically contacts the conductive layers 538 of the coating 536. The busbars described herein may extend through all or part of the coating 536, as shown in FIG. 5. The coating 536 may include conductive and non-conductive material in any form, including stacked and non-stacked materials. Preferably, the etching 550 reaches each conductive layer 538 or part of the coating 536, such that the electrically conductive material 552 is in contact with each conductive material 538 in the coating 536. For example, in the case of a layered silver stack 536, base layers of the stack may be applied to a glass substrate 520 before a silver layer 538. The etching 550 may not extend through non-conductive base layers adjacent to the glass 520 and may still be deep enough to reach each conductive layer 538. As shown in FIG. 5, the etching 550 of a stacked coating 536 extends through each conductive layer 538 of the coating 536 but does not reach the surface of the coated glass substrate 520. In FIG. 5, an IRR coating 536 comprising three silver layers 538 is illustrated as an example without limitation. It should be appreciated that other conductive coating designs, stacked and non-stacked, may be contemplated according to aspects of the present disclosure, including IRR coatings having more, less than, or equal to three silver layers, nanowire coatings, and low-emissivity coatings. In some embodiments, conductive coatings may include coatings, such as transparent conductive oxides (e.g., indium tin oxide), having a non-conductive top coating which may, for example, improve handling capabilities. Other coatings used with glass substrates may include antireflective or head-up display coatings. The methods disclosed herein may be used with any connectable coating or combination of coatings having connectable materials.

The etching may be any shape to expose conductive layers or elements of a coating. The etching process may be conducted at room temperature. In some embodiments, a particular temperature or pressure condition may be preferred. The amount of etching 550 may depend on the environmental conditions at the application of the electrically conductive material or the concentrations of etching elements in the conductive material. Further, the electrically conductive material may be cured in some embodiments, and the amount of etching 550 may depend on the time from the application of electrically conductive material prior to curing the electrically conductive material. Where there is more time between application and curing, there may be more extensive etching 550 in the coating 536. Preferably, the etching process is not heat treated above 500° C. More preferably, the etching process is not heat treated above 300° C., and more preferably, the etching process is not heat treated above 250° C.

The size of the busbar, or the area where electrically conductive material is applied, may affect the electrical connection formed. The etching provides access to conductive material to create the electrical connection. Thus, providing more access to the conductive material may provide an improved connection at the busbar, decreasing contact resistance and increasing homogeneity of the electrical connection. A larger application of electrically conductive material may lead to a stronger electrical connection, particularly with respect to the width of the electrically conductive material on the coating. Preferably, the width of the conductive material may be from 1 mm to 10 mm, more preferably from 2 mm to 7.5 mm, and even more preferably from 3 mm to 5 mm.

The coating may be applied before or after bending where bending may include heat treatment. In some cases, a coating may not be suitable to a bending process which requires high temperatures (e.g., 580-700° C.) and the coating and etching may be done after bending a glass substrate. The disclosure herein may be used in any conductive coating, independent of a heat treatment. In some further embodiments, coated substrate may remain flat and there is no bending heat treatment.

The electrically conductive material may form a connection area on the coating surface where the material is applied. Electrically conductive liquids or pastes may be used as an electrically conductive material. In some embodiments, the electrically conductive material may be a solid, such as a wire. Preferably, the electrically conductive material may include silver, copper, gold, tin, bismuth or other electrically conductive particles. Some embodiments may particularly include a liquid or paste comprising silver or tin particles may be suitable to form a busbar. The electrically conductive material may contain an etching element which may allow conductive particles or compounds in the conductive material to migrate through the coating to provide electrical connection to underlying conductive layers in the coating. The etching element may be any suitable material, including flux which may include acids, such as melonic acid or carboxylic acid. In particular embodiments, a tin soldering paste having melonic acid may be used to etch and distribute conductive particles within the coating simultaneously. In some further embodiments, a flux-free material may be used. For example, a soldering wire for use with ultrasonic treatment may include etching elements, which form bonds with non-conductive layers of the coating using oxides therein to reach underlying coating layers. For example, Cerasolzer® (such as #217 or #155) from Kuroda Techno may be used. These may include suitable conductive materials, such as Zn, Ti, Si, Al, Be, and Rare Earth Elements, which may react strongly with oxygen and create a strong bond with the underlying coated surface, particularly in the presence of an ultrasonically-produced cavitation field. Preferably, the electrically conductive material has melting and boiling points above a temperature used for autoclaving. Thus, the electrically conductive material may remain intact during a lamination process. The electrically conductive material may or may not be cured prior to lamination. Properties of the conductive material, including viscosity, may provide some embodiments where curing is preferred. In some embodiments, curing may be targeted to a surface layer of the conductive material, such that the lower portion of the conductive material may continue to etch and form electrical connection in the coating while a surface level is suitable for handling during the production process.

The conductive material may be applied by any suitable means where the conductive material may etch through the coating such that conductive material reaches conductive layers of the coating. The conductive material may etch through a top coating layer; thus, the conductive material may be applied directly to the coating. In some further embodiments, the conductive material may be applied with ultrasonic treatment. Particularly, the electrically conductive material may be activated by ultrasonic vibrations, or, may be easily bonded to coating oxide materials in the presence of an ultrasonically-produced cavitation field created by ultrasonic vibrations. Such ultrasonic vibrations may be applied to a melted solder that is applied to a coated glass substrate.

Preferably the conductive material creates an even surface in height and width over the conductive coating. An even conductive material surface may form a more homogeneous electrical connection. An electrical connection can be made with any suitable connector, such as a metal plate or foil and attached by any suitable means, including soldering or with conductive adhesive. Preferably, the foil may be a copper foil. When power is applied to the coating, it may then heat, or otherwise provide power to, the laminated glazing due to the electrical connection formed at the etching 550.

In a particular example, a tin soldering paste was applied to an IRR coating having conductive and non-conductive layers on a glass substrate, creating a busbar for electrical connection. Particularly, the soldering paste may include flux, which includes acids with may etch the coating. After lamination of the coated glass substrate, a resistance of 2.3 and 1.88 Ohm were determined. The theoretical limit of the resistance in the examples was 1.7 Ohm. Thus, the etching with an electrically conductive material formed an electrical connection with the coating.

The conductive coating having conductive etchings may be on any suitable substrate, including glass or polymer film. For example, the conductive coating may be formed on a polyethylene terephthalate (PET) film, which may be laminated within a glazing. A polymer film coating may need to be electrically connected outside of a heat treatment, which may include heating above the melting temperatures of the film. Where the coating is applied to a glass substrate, the coating may be applied to any surface. Preferably, in a laminated glazing, the coating may be on at least one of surfaces S2, S3, and S4. Any suitable glass substrate may be used in the constructions disclosed herein. In some embodiments, the glass substrate to be coated may preferably be from 0.05 mm to 2.7 mm, more preferably from 0.5 mm to 2.1 mm, or from 0.7 mm to 1.8 mm in thickness.

Figure 6:
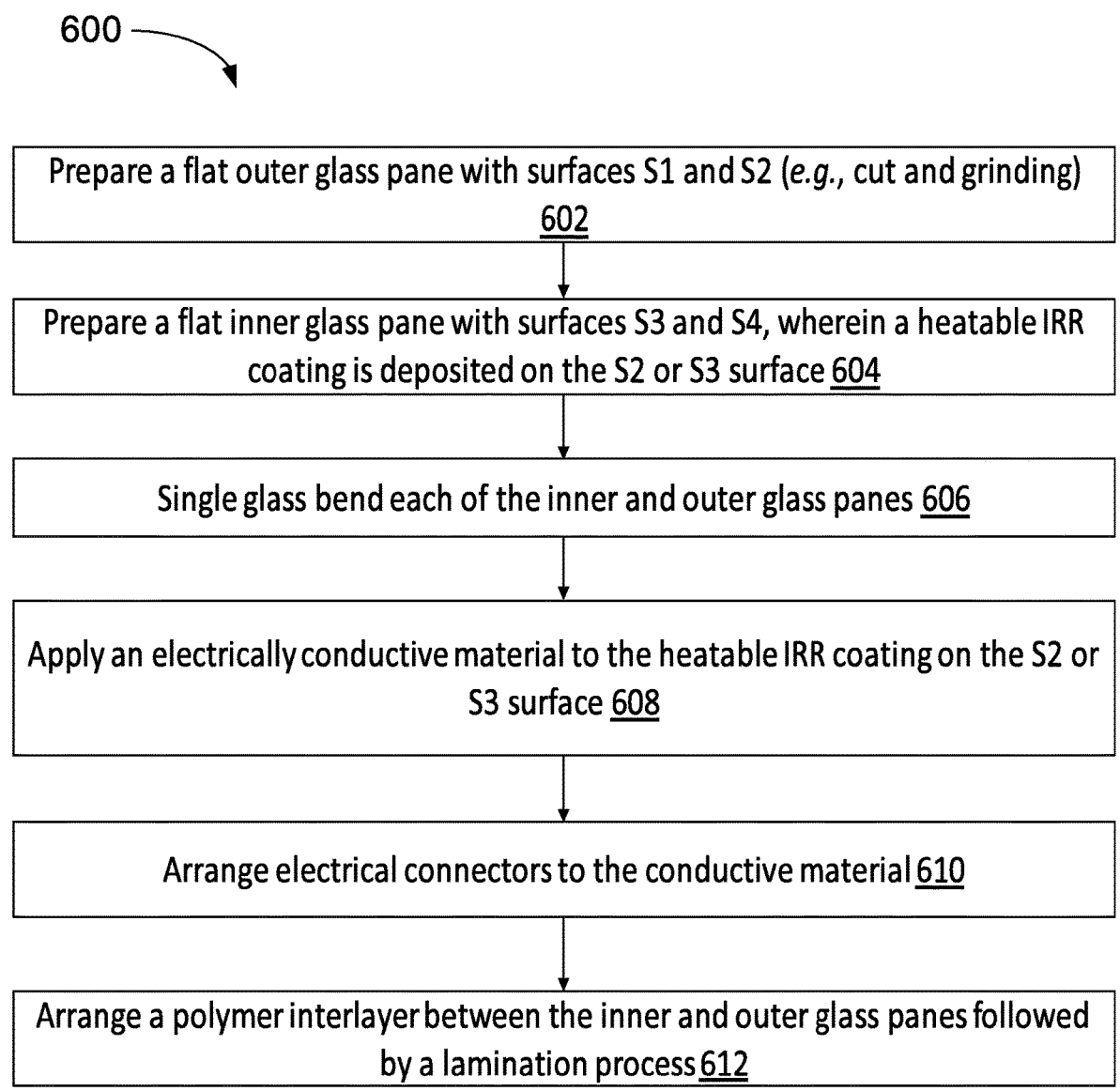
FIG. 6 illustrates an example manufacturing process of a conductive laminated vehicle windshield, according to an exemplary aspect of the present disclosure.
Figure 7:
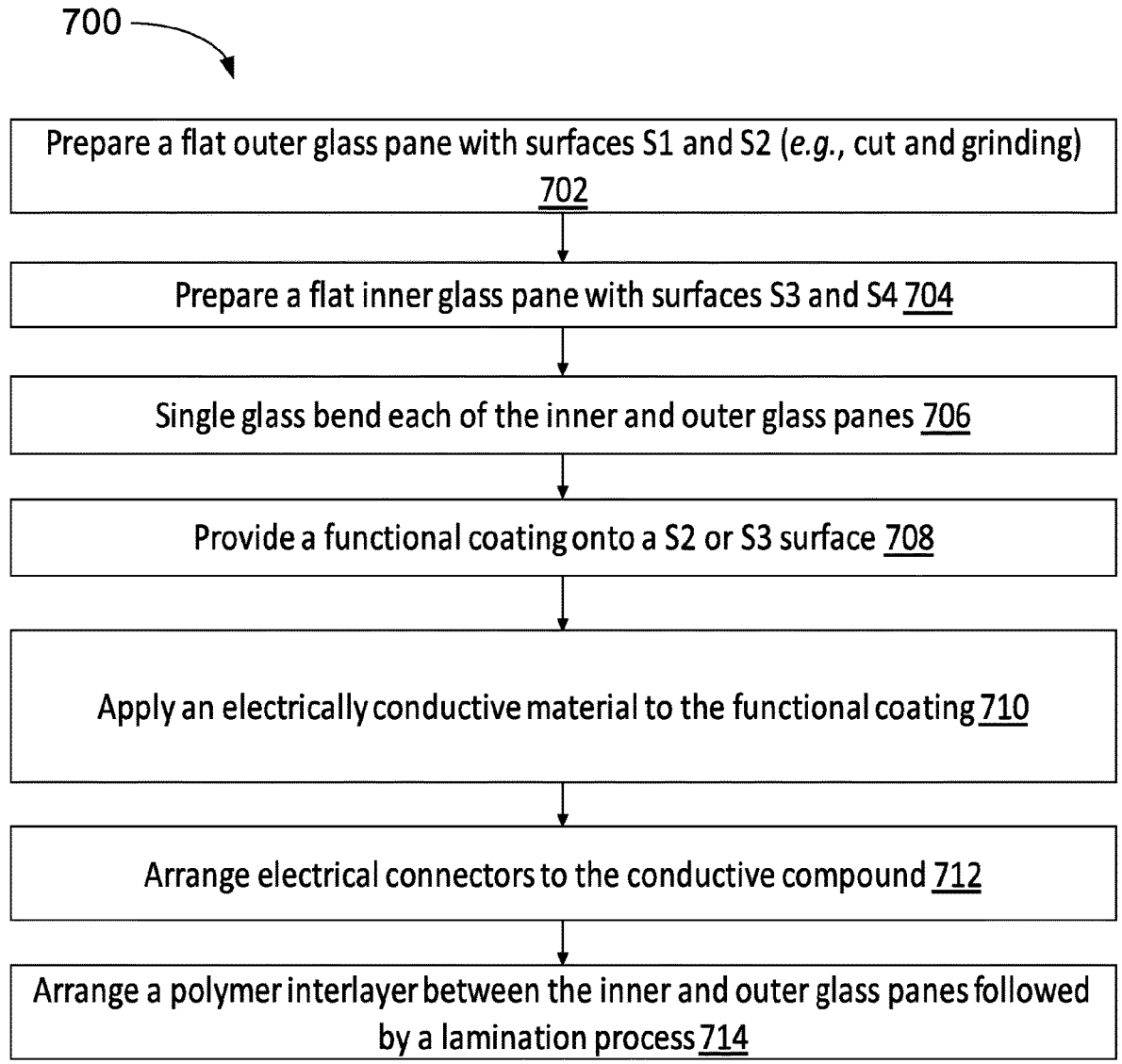
FIG. 7 illustrates another example manufacturing process of a conductive laminated vehicle windshield, according to an exemplary aspect of the present disclosure.
Figure 8:
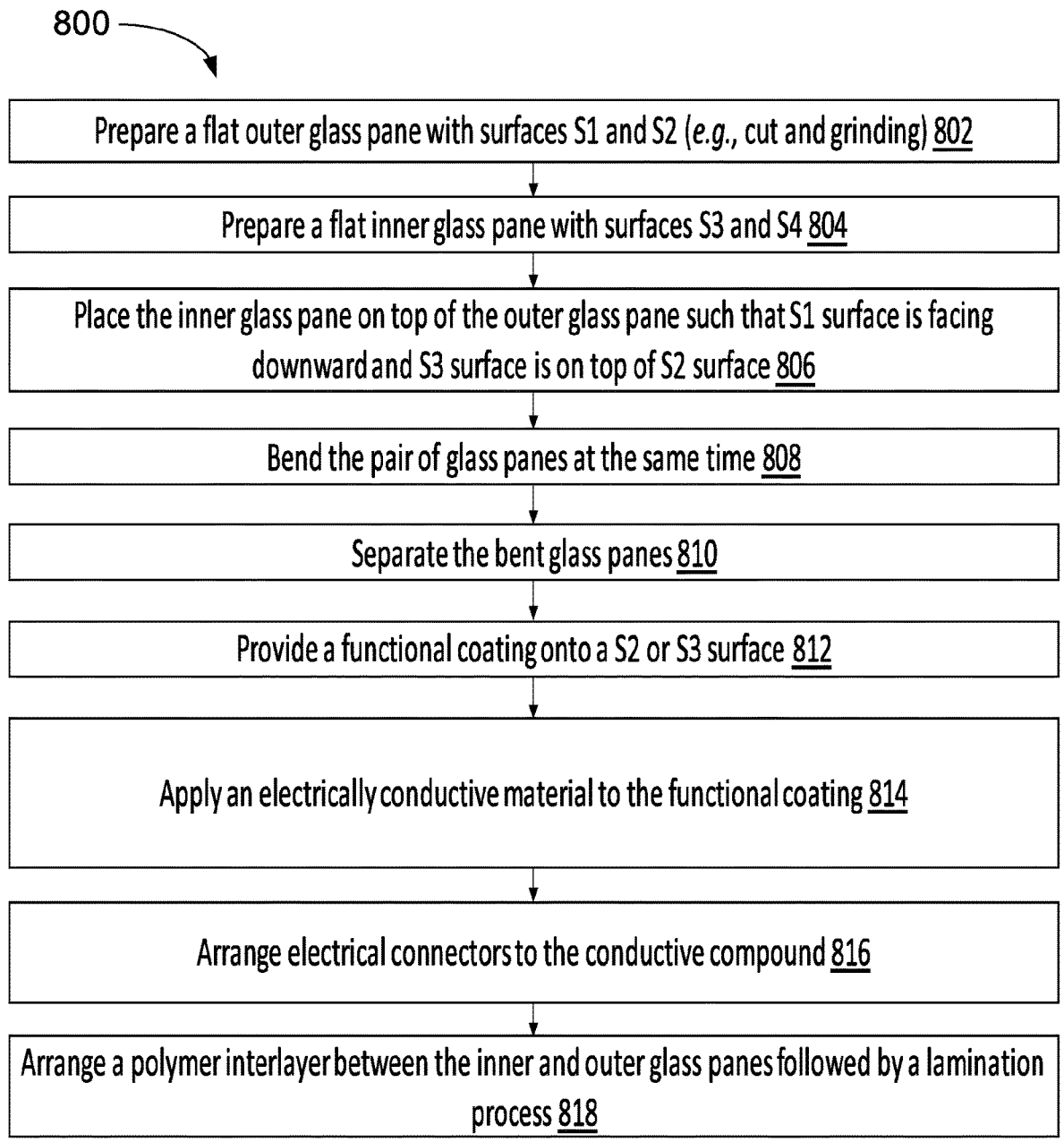
FIG. 8 illustrates yet another example manufacturing process of a conductive laminated vehicle windshield, according to an exemplary aspect of the present disclosure.

According to aspects of the present disclosure, referring to FIG. 6, a manufacturing process 600 of a conductive laminated vehicle window may comprise the following steps.

Step 602 includes preparing a flat outer glass pane with surfaces S1 and S2 (e.g., cut and grinding), with optional screen printing of opaque paste enamel (e.g., black enamel printing) on the S2 surface, and firing the optional opaque enamel.

Step 604 includes preparing a flat inner glass pane with surfaces S3 and S4, wherein a heatable IRR coating is deposited on the S3 surface, and optionally screen printing opaque or silver enamel on the S4 surface. The heatable IRR coating may be deposited by physical vapor deposition or atomic layer deposition without limitation.

Step 606 includes single glass bending of the inner and outer glass panes, respectively, by, for example, a mold press bending.

Step 608 includes applying an electrically conductive material to the heatable IRR coating on the S3 surface. The conductive material may be a busbar and provide electrical contact between the silver layers in the coating and an external power source (e.g., a battery in a vehicle). The conductive material may optionally be treated with ultrasonic treatment, such as ultrasonic vibrations.

Step 610 includes arranging of electrical connector(s) (such as metal plate or copper foil) to the busbar (the conductive material). For example, an electrically conductive copper foil may be glued to the conductive material (the busbar), and then a suitable connector may be soldered on the copper foil.

Step 612 includes arranging a polymer interlayer (e.g., polyvinyl butyral, PVB, sheet of about 0.8 mm thickness) between the inner and outer glass panes, and performing a conventional lamination process (e.g., autoclaving).

Other conductive coatings may further be used in the disclosed methods. For example, the coating may comprise an infrared reflective coating, a nanowire coating, or a low-emissivity coating. The coating may be heatable and/or act as a source of electrical power. In some embodiments, the coating may receive electromagnetic signals, such as for an antenna, or guide an electrical current as a conductor.

According to aspects of the present disclosure, a manufacturing process 700 of a conductive laminated vehicle window may comprise the following steps.

Step 702 includes preparing a flat outer glass pane with surfaces S1 and S2 (e.g., cut and grinding), with optional screen printing of opaque paste enamel (e.g., black enamel printing) on the S2 surface, and firing the optional opaque enamel.

Step 704 includes preparing a flat inner glass pane with surfaces S3 and S4, and optionally screen printing opaque or silver enamel on the S4 surface.

Step 706 includes single glass bending of the inner and outer glass panes, respectively, by, for example, mold press bending.

Step 708 includes depositing a heatable or other functional coating onto at least one of surface S2 or surface S3. According to an aspect of the present disclosure, such a functional coating may not need to survive heat-treatment (e.g., thermal bending). That is, a functional coating not having heat-treatability (i.e., not durable in a thermal bending process) may be used during a manufacturing process with less strict requirements for physical and chemical high-durability for the heat-treatment. An example of the coating is a silver nanowire (AgNW) heatable coating, which may provide improved heating capability for defrosting, defogging or deicing.

Step 710 includes application of electrically conductive material onto the functional coating of step 708. The conductive material may be a busbar and provide electrical contacts between the silver layers in the coating and an external power source (e.g., a battery in a vehicle). The conductive material may be optionally treated with ultrasonic treatment, such as ultrasonic vibrations.

Step 712 includes arranging of an electrical connector (such as a metal plate or copper foil) to the busbar.

Step 714 includes arranging a polymer interlayer (e.g., polyvinyl butyral, PVB, sheet having a thickness of about 0.8 mm), and performing a conventional lamination process (e.g., autoclaving).

According to yet another aspect of the present disclosure, a manufacturing process 800 of a conductive laminated vehicle window may comprise the following steps.

Step 802 includes preparing a flat outer glass pane with surfaces S1 and S2 (e.g., cut and grinding), with optional screen printing of opaque paste enamel (e.g., black enamel printing) on the S2 surface, and firing the optional opaque enamel.

Step 804 includes preparing a flat inner glass pane with surfaces S3 and S4, and optionally screen printing and firing of opaque or silver enamel on the S4 surface.

Step 806 includes assembling the outer glass pane and inner glass pane such that the surface S1 of the outer glass pane is mostly downward (i.e., the surface S2 is upward) and the surface S3 of the inner glass pane is on and facing the surface S2 (i.e., the surface S4 is mostly upward), as shown in FIG. 2.

Step 808 includes simultaneously bending the pair of glass panes of step 806 (e.g., double glass bending). For example, a gravity-sag bending process may be applicable.

Step 810 includes separating of the bent glass panes of the step 808.

Step 812 includes depositing of a heatable or other functional coating onto a S2 surface or S3 surface. Such a functional coating may not need to survive heat-treatment (e.g., thermal bending). That is, according to aspects of the present disclosure, a functional coating not having heat-treatability (i.e., not durable in a thermal bending process) may be used during a manufacturing process with less strict requirements for physical and chemical high-durability for the heat-treatment. An example of the coating is a silver nano-wired (SNW) heatable coating, which may provide improved heating capability for defrosting, defogging or deicing.

Step 814 includes applying an electrically conductive material on the coating of step 812. The conductive material may be a busbar and provide electrical contacts between the silver layers in the coating and an external power source (e.g., a battery in a vehicle). The conductive material may be optionally treated with ultrasonic treatment, such as ultrasonic vibrations.

Step 816 includes arranging of an electrical connector such as metal plate or copper foil to the busbar.

Step 818 includes arranging a polymer interlayer (e.g., polyvinyl butyral, PVB, sheet having a thickness of about 0.8 mm), and performing a conventional lamination process (e.g., autoclaving).

In further embodiments, glass substrates may be coated with a conductive coating prior to double glass bending.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. For example, without limitation, the busbar creation and arrangement by the etching disclosed in the present disclosure may also be applicable to create integrated antenna circulate (or lines) in a heatable laminated glazing (not limited to windshields) with an electrically conductive coating or an electrical conductor for directing an electrical current. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. An electrically connected coated substrate, comprising:
   a substrate;
   a coating including one or more conductive layers on the substrate; and
   a layer comprising electrically conductive material applied to a top surface of the coating,
      wherein, the electrically conductive material comprises a busbar, an etchant and soldering paste and is not heat treated above 500° C., and
      wherein, the top layer of the coating is electrically non-conductive and the electrically conductive material is in contact with at least one conductive layer of the coating by etching of the coating.

2. The electrically connected coated substrate according to claim 1, wherein the coating is heatable.

3. The electrically connected coated substrate according to claim 1, wherein the coating comprises at least one of an infrared reflective coating, a nanowire coating, a low-emissivity coating, a transparent conductive oxide, and combinations thereof.

4. The electrically connected coated substrate according to claim 1, wherein the coating comprises an infrared reflective coating including at least two silver layers.

5. The electrically connected coated substrate according to claim 1, wherein the electrically conductive material comprises tin.

6. A vehicle glazing, comprising:
   a first glass substrate;
   a second glass substrate; and
   at least one polymer interlayer between the first glass substrate and the second glass substrate,
   wherein at least one of the first glass substrate and the second glass substrate comprises the electrically connected coated substrate according to claim 1.

7. The vehicle glazing according to claim 6,
   wherein the first glass substrate has a S1 surface facing vehicle a vehicle exterior and a S2 surface opposite the S1 surface,
   wherein the second glass substrate has a S3 surface and a S4 surface opposite the S3 surface and facing a vehicle interior, and
   wherein the coating is provided on a surface selected from the group consisting of the S2 surface of the first glass substrate and the S3 surface of the second glass substrate.

8. The vehicle glazing according to claim 7, wherein the coating is provided on the S3 surface of the second glass substrate.

* * * * *